United States Patent
Wun et al.

(10) Patent No.: US 10,069,941 B2
(45) Date of Patent: Sep. 4, 2018

(54) SCALABLE EVENT-BASED NOTIFICATIONS

(71) Applicant: Microsoft Technology Licensing, LLC., Redmond, WA (US)

(72) Inventors: Alex Wun, Renton, WA (US); Vipul A. Modi, Sammamish, WA (US); Lu Xun, Redmond, WA (US); Mansoor Mohsin, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 338 days.

(21) Appl. No.: 14/863,107

(22) Filed: Sep. 23, 2015

(65) Prior Publication Data

US 2016/0323138 A1 Nov. 3, 2016

Related U.S. Application Data

(60) Provisional application No. 62/154,085, filed on Apr. 28, 2015.

(51) Int. Cl.
*H04L 29/06* (2006.01)
*H04L 12/24* (2006.01)
*H04L 29/08* (2006.01)

(52) U.S. Cl.
CPC .......... *H04L 67/42* (2013.01); *H04L 41/5041* (2013.01); *H04L 41/0695* (2013.01); *H04L 67/34* (2013.01)

(58) Field of Classification Search
CPC ..... G06F 11/3006; G06F 11/302; H04L 67/34
USPC ........................................................ 714/48
See application file for complete search history.

(56) References Cited

U.S. PATENT DOCUMENTS

| | | | |
|---|---|---|---|
| 8,522,086 B1* | 8/2013 | Garrett | G06F 11/3006 714/48 |
| 8,830,823 B2 | 9/2014 | Koponen et al. | |
| 9,398,090 B2* | 7/2016 | Houston | H04L 67/1095 |
| 2004/0260819 A1* | 12/2004 | Trossen | H04L 29/06 709/229 |
| 2006/0059165 A1* | 3/2006 | Bosloy | H04L 49/355 |
| 2007/0094304 A1* | 4/2007 | Horner | G06Q 10/10 |

(Continued)

FOREIGN PATENT DOCUMENTS

| | | |
|---|---|---|
| CN | 102739775 A | 10/2012 |
| CN | 103780497 A | 5/2014 |

*Primary Examiner* — Kevin Bates
*Assistant Examiner* — Chen-Liang Huang (57) ABSTRACT

Embodiments are directed to a cluster of nodes configured to run one or more services. A gateway on each node is configured to provide communication between the node and clients. The gateways manage filters designated by the clients, wherein the filters are named based upon a naming format used to name the services. The gateways receive configuration updates broadcast by a failover manager. The configuration updates comprise service endpoint changes for services running on the nodes. The gateways provide notifications to clients when a filter name matches at least a portion of a service name in a configuration update. The configuration updates identify a configuration version, and the gateways may provide notifications with endpoint information from more than one configuration update version. Notifications may be configured to be sent only when the endpoint for a primary replica of a service has changed.

15 Claims, 4 Drawing Sheets

(56) References Cited

U.S. PATENT DOCUMENTS

| | | | |
|---|---|---|---|
| 2007/0112446 A1* | 5/2007 | Deveaux | G06F 8/60 |
| | | | 700/83 |
| 2007/0283049 A1* | 12/2007 | Rakowski | G06F 9/44505 |
| | | | 709/246 |
| 2010/0293334 A1 | 11/2010 | Xun et al. | |
| 2011/0016090 A1 | 1/2011 | Krishnaprasad et al. | |
| 2011/0145363 A1* | 6/2011 | Ananthanarayanan | |
| | | | G06F 17/30132 |
| | | | 709/218 |
| 2012/0151272 A1 | 6/2012 | Behrendt et al. | |
| 2013/0159488 A1* | 6/2013 | Jeyapaul | H04L 61/2076 |
| | | | 709/223 |
| 2014/0040466 A1* | 2/2014 | Yang | H04L 1/22 |
| | | | 709/224 |
| 2014/0143367 A1 | 5/2014 | Dahlin et al. | |
| 2015/0052105 A1* | 2/2015 | Nguyen | G06F 17/30174 |
| | | | 707/626 |
| 2015/0271276 A1* | 9/2015 | Edlund | H04L 41/06 |
| | | | 709/224 |
| 2016/0094356 A1* | 3/2016 | Xiang | H04L 12/1868 |
| | | | 370/390 |
| 2016/0134469 A1* | 5/2016 | Carter | H04L 63/0823 |
| | | | 370/254 |
| 2017/0149715 A1* | 5/2017 | Watte | H04L 51/18 |

* cited by examiner

SCALABLE EVENT-BASED NOTIFICATIONS

CROSS-REFERENCE TO RELATED APPLICATIONS

This application claims the benefit of the filing date of U.S. Provisional Patent Application No. 62/154,085, which is titled "Scalable Event-based Notifications" and was filed Apr. 28, 2015, the disclosure of which is hereby incorporated by reference herein in its entirety.

BACKGROUND

A distributed system, such as a cluster of computing nodes, may host and dynamically load-balance a number of services that are available to external clients. The clients require up-to-date information regarding the location of the hosted services on the cluster. Previous solutions, such as long-polling based solutions, do not scale with the number of hosted services. In existing systems, poll notifications identify each partition for services that clients have selected. As distributed services are partitioned across multiple nodes, the poll can become very large and unmanageable due to the amount of data.

Other existing solutions in which the notification protocol and API operates at partition granularity do not provide the scalability required for distributed systems. For example, a single resolution request from a client to a gateway consists of a <Service Name, Partition Key> tuple. However, the partition key concept is too fine-grained for the client/gateway protocol. For range-partitioned services, this does not scale since it is common practice to choose [0, Maximum Integer] for the overall service key space.

A complaint-based mechanism cannot always be used to locate services on a cluster. There are situations in which the client cache must be updated proactively because the client does not have enough information to know when cached entries are invalid. For example, the client may just be blindly forwarding messages between the real application client and service. Currently, the application must either perform its own resolution polling or register notifications for all relevant partitions of all relevant services.

Pre-fetching into the cache is a common scenario in existing systems. This has been common for latency sensitive applications. Similar to the complaint-based mechanism, the application must either perform its own resolution polling or register notifications for all relevant partitions of all relevant services in order to achieve this.

In other embodiments, notifications may be implemented as non-paged long-polls. Notification polling happens periodically and each poll is just a single request/reply pair. Each long-poll request contains the entire notification filter. If either a request or reply exceeds the limit for a single message, then the unsent portions of the request or reply are deferred until the next poll. This means that large notification requests or replies can experience latencies dependent on the poll interval. It becomes difficult for the application to tune this notification interval since the application generally wants notifications as soon as possible. Additionally, it is not desirable to have clients constantly poll the system with notification filters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment comprises a plurality of nodes configured to run one or more services, each of the nodes comprising a gateway configured to provide communication between the node and clients. The gateways are configured to manage filters designated by the clients, wherein the filters are named based upon a naming format used to name the services. The gateways are further configured to receive configuration updates broadcast by a failover manager. The configuration updates comprise service endpoint changes for services running on the nodes. The gateways provide notifications to clients when a filter name matches at least a portion of a service name in a configuration update.

The failover manager manages service deployment on the plurality of nodes, which may be a cluster in a distributed computing system.

The configuration updates identify a configuration version, and the gateways may provide notifications with endpoint information from more than one configuration update version.

A filter may be configured to match either a prefix of a service name or an entire service name. The gateways may be configured to provide notifications to clients only when the endpoint for a primary replica of a service has changed.

The gateways maintain a cache of received node configuration updates and to provide notifications to reconnected clients when a filter name matches at least a portion of a service name in the cache.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
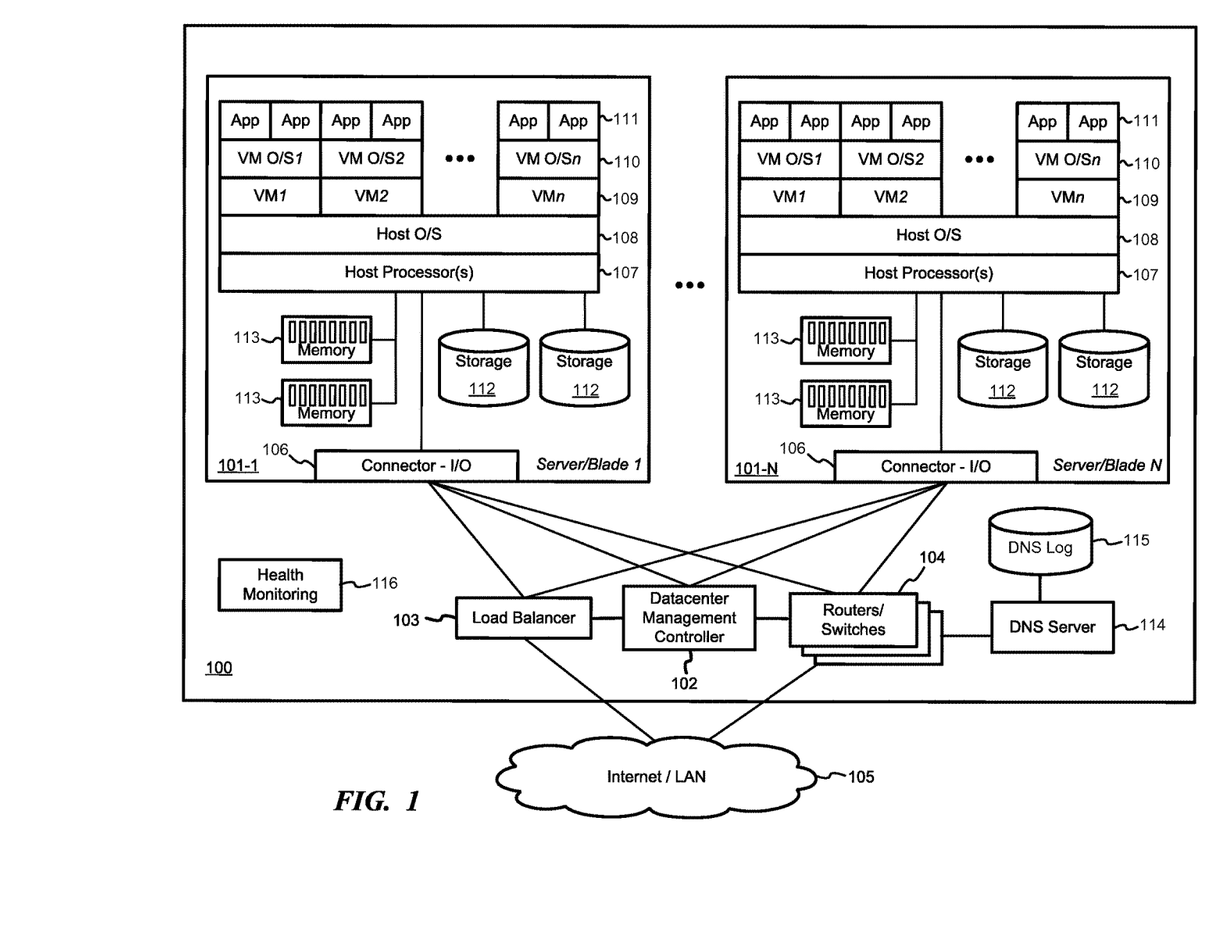
FIG. 1 is a high level block diagram of an example datacenter that provides cloud computing services or distributed computing services.

FIG. 1 is a high level block diagram of an example datacenter 100 that provides cloud computing services or distributed computing services. A plurality of servers 101 are managed by datacenter management controller 102. Load balancer 103 distributes requests and workloads over servers 101 to avoid a situation wherein a single server may become overwhelmed. Load balancer 103 maximizes available capacity and performance of the resources in datacenter 100. Routers/switches 104 support data traffic between servers 101 and between datacenter 100 and external resources and users (not shown) via an external network 105, which may be, for example, a local area network (LAN) or the Internet.

Servers 101 may be standalone computing devices and/or they may be configured as individual blades in a rack of one or more server devices. Servers 101 have an input/output (I/O) connector 106 that manages communication with other database entities. One or more host processors 107 on each server 101 run a host operating system (O/S) 108 that supports multiple virtual machines (VM) 109. Each VM 109 may run its own O/S so that each VM O/S 110 on a server is different, or the same, or a mix of both. The VM O/S's 110 may be, for example, different versions of the same 0/S (e.g., different VMs running different current and legacy versions of the Windows® operating system). In addition, or alternatively, the VM O/S's 110 may be provided by different manufacturers (e.g., some VMs running the Windows® operating system, while others VMs are running the Linux® operating system). Each VM 109 may also run one or more applications (App) 111. Each server 101 also includes storage 112 (e.g., hard disk drives (HDD)) and memory 113 (e.g., RAM) that can be accessed and used by the host processors 107 and VMs 109 for storing software code, data, etc.

Datacenter 100 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 100 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 109 on server 101-1 to run their applications 111. When demand for an application 111 increases, the datacenter 100 may activate additional VMs 109 on the same server 101-1 and/or on a new server 101-N as needed. These additional VMs 109 can be deactivated if demand for the application later drops.

Datacenter 100 may offer guaranteed availability, disaster recovery, and back-up services. For example, the datacenter may designate one VM 109 on server 101-1 as the primary location for the tenant's application and may activate a second VM 109 on the same or different server as a standby or back-up in case the first VM or server 101-1 fails. Database manager 102 automatically shifts incoming user requests from the primary VM to the back-up VM without requiring tenant intervention. Although datacenter 100 is illustrated as a single location, it will be understood that servers 101 may be distributed to multiple locations across the globe to provide additional redundancy and disaster recovery capabilities. Additionally, datacenter 100 may be an on-premises, private system that provides services to a single enterprise user or may be a publically accessible, distributed system that provides services to multiple, unrelated customers and tenants or may be a combination of both.

Domain Name System (DNS) server 114 resolves domain and host names into IP addresses for all roles, applications, and services in datacenter 100. DNS log 115 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 116 monitors the health of the physical systems, software, and environment in datacenter 100. Health monitoring 116 provides feedback to datacenter managers when problems are detected with servers, blades, processors, or applications in datacenter 100 or when network bandwidth or communications issues arise.

Embodiments disclosed herein are directed to event-based service change notifications for services running on servers and/or VMs in a distributed system. This disclosure addresses the following limitations in existing systems:
  Partition Key concept is too fine-grained for client/gateway protocol;
  Complaint-based mechanisms were not always available to be used;
  Pre-fetching into the cache was a common scenario;
  Notifications were implemented as non-paged long-polls; and
  Notifications on non-existent services were not allowed.
In the notification process disclosed herein:
  Changes will only affect the client/gateway protocol, but an existing failover manager/gateway broadcast protocol is not impacted;
  Event-based notifications introduce a new public Application Programming Interface (API) and co-exist with long-poll notifications; and
  Other named resource notifications associated with services may also be built on top of the changes described in this document.

Figure 2:
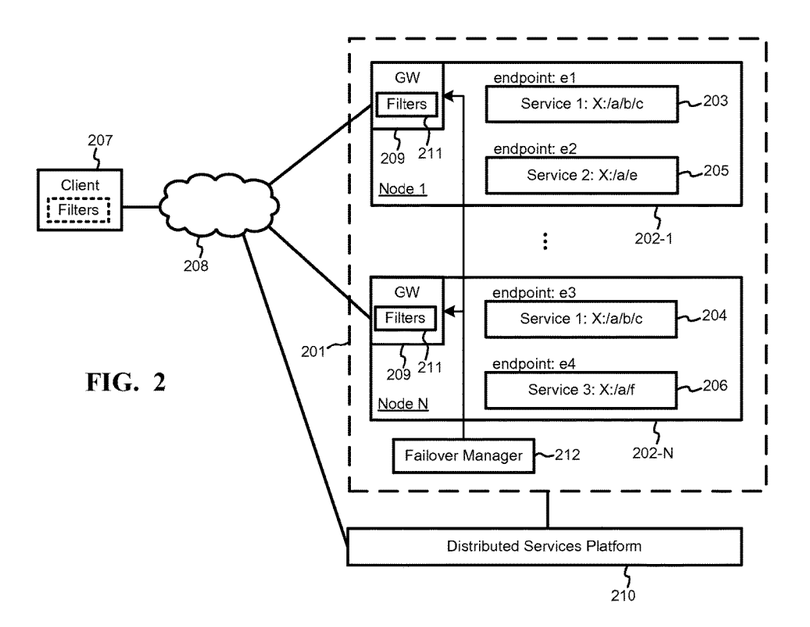
FIG. 2 is a block diagram illustrating a simplified cluster comprising N nodes with gateways and a failover manager.

FIG. 2 is a block diagram illustrating a simplified cluster 201 comprising N nodes 202, which may represent different servers, processors, or VMs. For example, in the example illustrated in FIG. 1, servers 101, processors 107, or VMs 109 may correspond to different nodes 202. Nodes 202 operate as part of a cluster 201 that manages various instances of service 203-206. Cluster 201 controls the service instances 203-206 running on the nodes 202 and balances the service load among the nodes. Cluster 201 also provides backup and redundancy for the services. In a datacenter environment, there may be tens of thousands of service instances deployed on a cluster.

Users access the applications and services deployed on cluster 201 via a client 207, which may be, for example, an application running on a desktop, laptop, or tablet computer or on a mobile device. Client 207 communicates with cluster 201 through network 208, which may be any public or private data network, such as the Internet, an intranet, or a LAN. Client 207 accesses services running on the cluster though a gateway 209, which is the entry point for the clients to access the nodes 202. In order to access a service 203-206, the client 207 connects to any gateway 209 and registers a filter 211 to determine the endpoint assigned to a target service instance running on the cluster 201. The client 207 then communicates with the target service instance 203-206.

When a node 202 fails, the service 203-206 on the failed node are relocated and rebalanced to another node in a cluster, which results in the assigned endpoint changing for the relocated service. Advantageously, a datacenter may use a notification mechanism to assist clients in finding service instances after they have been moved. By providing a scalable notification mechanism, the cluster is capable of hosting large numbers of services.

Cluster 201 may be supported by a distributed services platform 210 that understands the available infrastructure resources and the requirements of the services and applications running on the cluster. Distributed services platform 210 provides comprehensive runtime and lifecycle management capabilities and enables automatic updating and self-healing to ensure delivery of highly available and durable services via cluster 201. Distributed services platform 210 supports microservices in which complex applications are composed of small, independently versioned services running at very high density on a shared pool of machines, such as cluster 201. In one example, distributed services platform 210 may be the Azure Service Fabric provided by Microsoft Corporation. Distributed services platform 210 manages the service endpoints in cluster 201.

A distributed services platform 210, such as Microsoft Corporation's Fabric, is a framework for hosting services. The distributed services platform 210 handles availability, service discovery, partitioning, zero-downtime upgrades, monitoring, load balancing, failure detection, and data replication. The distributed services platform 210 allows users to deploy packages to it under a URI of their choosing using the format X:/a/b/c (e.g., fabric:/mystuff/demo).

When a new service is started on cluster 201, the service instance is assigned an endpoint. For example, in FIG. 2, a first instance of Service 1 (203) is named "X:/a/b/c" by the user. Service 1 203 is assigned endpoint e1 on node 1 (202-1). A second instance of Service 1 (204) is also named "X:/a/b/c" and assigned endpoint e3 on node N (202-N). Other services, Service 2 (205) and Service 3 (206), are named "X:/a/e" and "X:/a/f," respectively, and assigned endpoints e2 and e4. Client 207 connects to a gateway 209 and, using the notification protocol described herein, obtains the endpoint of a target service. The service instances 203-206 may be spread across multiple nodes as illustrated. Over time, services may be moved due to node failure, load balancing, or variations in user demand. Accordingly, the endpoint for a target service may change over time. The notification protocol assists the client in locating the target service.

Embodiments allow a client to register interest in a portion of a service namespace, such as by identifying the prefix of a service name. This allows a single filter to be used to collect information about any services that are associated with the selected service name prefix. For example, referring to the example services and endpoints assigned in FIG. 2, a notification filter registered for service name "X:/a" will receive endpoint information for all service instances 203-206 since all of the services match that prefix. Alternatively, a notification filter registered for "X:/a/b" will only return information for service instances 203, 204, which are associated with Service 1, since the name of both instances 203, 204 match the "X:/a/b" prefix. A client may register interest in a specific service, such as instance 206, by registering a notification filter using a more specific name prefix, such as "X:/a/f". This filter will only return information about service instance 206 since that is the only service that matches the filter's prefix.

Notification Filters.

A conceptual design overview for an example embodiment using notification filters as shown in FIG. 2 is described below. Registered filters 211 are maintained on both the client 207 and gateway 209. Filter evaluation happens on the gateway 209 using a service notification filter manager. Each client 207 registers one filter per service namespace of interest. The filters are named using the name of the target service or its prefix. The filters may be further defined for either "prefix" or "exact" matching.

For example, a Prefix flag may be set on a filter 211. When the Prefix flag is set, then gateway 209 will use filter 211 to match all services under that filter's Name. If the Prefix flag is not set, then the filter matches only the service name exactly. The Prefix flag allows for optimizing scenarios that previously required registering many handlers for individual services.

A PrimaryOnly flag may also be set on a filter 211. When the PrimaryOnly flag is set, then the gateway 209 will use the filter 211 to match only those service configuration updates in which the endpoint of the primary replica of the target service has changed. As such, the PrimaryOnly flag has no effect on stateless services. Secondary replica endpoints, if present, are identified to the client 207 only when the PrimaryOnly flag is not set.

Failover Manager (FM) 212 is a cluster system service that maintains all endpoints for all of the services on cluster 201. FM 212 periodically broadcasts those endpoints to the rest of the cluster to provide current configuration version information. Each gateway 209 maintains its own set of filters. The FM broadcast goes to each node 202. The local gateway 209 on each node then matches the broadcast content (i.e., current service names and endpoints) against the registered filters and passes relevant endpoint updates to the clients as notifications.

The gateway 209 performs two versions of filter matching: Broadcast against Filter and Filter against Cache.

Broadcast against Filter matches each incoming FM broadcast against the registered filters. This is the normal mode of operation.

Filter against Cache runs when a client reconnects to the cluster. The client sends its filters to the gateway to which it reconnects. That gateway matches all of the client's registered filters against the contents of the gateway cache of service endpoint information to identify missed notifications. The filters are matched against the cache—rather than the other way around—since the number of registered filters is expected to be much less than the number of cache entries.

As an alternative to the Prefix flag, an "Application" (services created under a common service name prefix) flag could be used in the filters so that a filter Name would be matched against application names rather than service names. The implementation would require FM broadcasts to include application name information. The embodiments described herein assume that the Prefix flag is used; however, the Application flag may be used as an alternative and most of the operation does not depend on either flag.

Notification Versioning.

Each reconfiguration of the cluster 201 is tracked with a monotonically increasing version number (i.e., Lookup Version) at the FM 212. When the FM broadcasts updated configurations, the FM broadcast includes a list of merged version ranges in the broadcast. Each gateway 209 maintains its own list of merged version ranges to represent the broadcasted updates the gateway has received. When no reconfigurations are occurring and a gateway 209 is in sync with the FM 212, this list will have a single range [0, Latest Lookup Version on FM]. This provides an efficient way for the gateway 209 to determine if it has missed any broadcasts from the FM 212.

This versioning approach can be used to track which notifications a client 207 has received, which allows the client to detect when it receives duplicate notifications and allows the gateway to identify missed notifications for a reconnecting client. Optimization of this approach depends on being able to merge many versions into a small number of version ranges (ideally, a single range). It is undesirable for the client to build its version ranges from the versions of individual notifications as this would result in many gaps.

Therefore, the gateway 209 sends a version range along with each notification to the client 207.

Notification versioning is independent of the client cache, which can contain entries populated by complaint-based service resolution and may even be disabled. Receiving a notification implies that a corresponding cache entry will exist, but an existing cache entry does not imply that a corresponding notification has been fired.

Unresponsive Clients.

Clients process received notifications and reply to the gateway so that the notification can be removed from the send queue. A client may not be able to talk to the gateway due to network issues, for example. In such cases, the gateway detects and proactively disconnects non-responsive clients.

In some cases, the system may be unable to deliver messages to clients despite a working network connection. This situation causes a backlog of unsent messages in the underlying transport (i.e., communication layer built on top of TCP). The receiving end of the transport relies on available threadpool threads in order to dispatch messages. If the receiving end has exhausted the threadpool, then it will stop dispatching. Higher-level requests on the sender side (gateway) will timeout, but the underlying message will remain in the transport message queue since the receiver's buffer is full. When the higher layer again tries to re-execute the timed out request, a new message is added to sender's transport queue. This leads to situations where the transport queue accumulates messages that are duplicates as far as the higher layer is concerned.

The notification feature protects the system from unbounded memory growth in the situation where notification requests are timing out but the underlying connection is not faulting. There are three aspects to this:

1) Retrying a timed out notification does not result in a duplicate transport level message. The sender may retry a notification indefinitely without experiencing memory growth.
2) The number of outstanding undelivered notifications per client is bounded. This can be configurable and a very high number, but it cannot be unbounded. The gateway has a configurable limit on how many notification client connections it will accept.
3) Policy is applied to eventually disconnect a client from the gateway side if the client does not seem to be accepting notifications.

To address aspect 1), the underlying transport supports looking up whether a message is still in the send queue. This can be done with a hash table of message IDs and can be an opt-in feature on the transport. Message IDs are used as the duplicate detection mechanism at the transport level since message IDs are used to correlate incoming replies with pending requests. Furthermore, only the higher layer knows whether a message is a retry or not, so the simplest approach is for the higher layer to generate message IDs explicitly. Responsibility is on the higher layer to correctly identify retries, but the transport layer can potentially provide some validation—e.g. a "retry" API can be introduced that only accepts immutable messages cloned from an original.

To address aspects 2) and 3), MaxNotificationClientConnections and MaxOutstandingNotificationsPerClient configurations are introduced. If these limits are reached, then the system stops pushing further notifications to the client. Since notifications would then be dropped, the gateway eventually disconnects the client to trigger reconnection. This occurs even if the client recovers, so there is no advantage in delaying the disconnection. The client can be disconnected immediately upon hitting this limit and, once disconnected, the underlying transport queue and all pending messages are freed. An alternative solution for 1) is to modify the transport send queue to remove messages that have timed out.

Transport-Level Notification Support.

Existing clients currently use a "client-side" transport (RequestReply) to communicate with the gateway. The client-side transport allows sending request/reply messages but not receiving unsolicited incoming messages. There are two main approaches for adding notification support to the client:

1) Add a transport listener to the client—i.e. add a "server-side" transport.
2) Enable "multi-part replies" on the existing client-side transport.

Approach 1) involves opening a listen port on the client to receive notifications while approach 2) involves re-using the anonymous reply channel from the gateway to send notifications. Opening a listen port on the client may introduce problems when dealing with firewalls and configuration, so it is not preferred.

For approach 2), a new class extending RequestReply is introduced to support uncorrelated incoming replies as request messages. An example factoring for this is:

```
DuplexRequestReply : public RequestReply
{
    typedef function<void(Message&, ISendTarget::SPtr const&)>
        IncomingRequestHandler;
    SetIncomingRequestHandler(IncomingRequestHandler const &);
}
```

The IncomingRequestHandler callback fires when the underlying RequestReply object receives a reply for which there was no pending request, including taking into consideration timed out requests. The gateway can then use a normal RequestReply to send notifications using the client's reply target. This effectively gives a duplex request/reply with the client initiating the connection to the gateway.

This approach has the following implications:

The client can only receive incoming requests from targets to which it has sent a request/reply message already;

The gateway cannot initiate connections to the client, it can only send to clients for which it has processed a request/reply message;

Both the client and gateway can send request/reply messages without any synchronization beyond the client's first request/reply message; and TCP KeepAlive will have to be enabled on the underlying TCP connection and transport's idle session timeout will have to be disabled.

This pattern can be built on top of existing transport abstractions and is amenable to having the underlying TCP implementation converted to an interactive communication session, such as WebSockets.

Multi-Channel Transport.

By using the reply connection for notifications, the system may potentially cause interference with normal request replies. To avoid this, support is provided for multiple connections per send target. For the purposes of this feature, the system exposes the ability to use multiple connections as a priority traffic concept. Notification traffic will be sent on a "high priority" connection while all other traffic will be sent on a "low priority" connection. The caller specifies the priority when sending a message. Internally, the transport does not necessarily have to treat high and low priority connections differently, the main purpose is to separate all notification traffic from normal traffic into different connections.

Client and Gateway Faults.

Both the client and gateway register transport fault handlers in order to detect disconnections. When the gateway detects a fault, it assumes that the client has unregistered and cleans-up all notification state for that client. When the client detects a fault, it will run a notification reconnection protocol once it is able to connect to any gateway (either a new gateway or the same gateway). The reconnection protocol is needed to avoid missing notifications due to temporary disconnections and gateway failover.

Client/Gateway Synchronization Protocol.

The initial client connection occurs by synchronizing with the gateway. The client sends its list of all registered filters along with a version range collection representing the versions of all notifications seen by this client (Vc), which are both initially empty:

Client→Gateway:
　Client ID
　Vc=List<Vers ion Range>
　Filters=List<Filter{ID, Name, Flags}>

The List<Version Range> parameter includes the list of version ranges previously received by the client. This list of version ranges is used by the gateway to determine what notifications to send and/or not send to the client.

The gateway adds a new client registration entry for this client based on its reply target and matches all filters against the gateway cache to identify any missed updates (i.e., those with versions not covered by Vc). Such updates, if any, are queued for delivery as normal notifications and Vc on the client is brought up-to-date through normal notification processing. Since the client initially has no filters registered, the system does not retro-actively deliver updates from a time before a filter was registered. The same protocol is used for both initial connection and re-connection if a gateway goes down. For functional correctness of detecting missed updates, adding/removing filters is disallowed while the connection protocol is running.

Client/Gateway Notification Protocol.

After synchronizing with the gateway, the client can register a new notification filter at any time, such as by sending:

Client→Gateway:
　Client ID
　Filter={ID, Name, Flags}.

The Name is the service name prefix of interest, and Flags are any flags set for the filter.

The gateway acknowledges the new filter but does not send any version updates to the client initially. Since new filters can be registered at any time, version updates are sent with actual notifications to prevent the client's version-view from becoming incorrect.

Upon receiving a broadcast containing lookup version ranges Vb from the FM, the gateway updates the gateway cache and then performs notification filter matching. For clients that have matching filters, the gateway sends:

Gateway→Client:
　Notifications=List<Version, Partition>
　Vn=Vb merged with Vg where Vn comprises the broadcast version range (Vb) plus the gateway cache (Vg).

Upon receiving this notification, the client merges Vn with its current Vc and acknowledges receipt of the notification back to the gateway. If the notification fails, then the gateway retries until the client is disconnected. If the notification needs to be paged, then Vn is split accordingly to match the versions in the actual notification.

Handling Concurrent Notifications.

The notification protocol described above assumes a single outstanding request/reply notification to the client, which is why the gateway can use Vn=(Vb merged with Vg). In order to support multiple outstanding notifications, the protocol must be extended slightly. Consider the following two updates broadcast from the FM:

U1=Versions [5, 10)
　U2=Versions [10, 15)

comprising ranges 5-10 and 10-15 from the FM.

Assuming the cache version starts at 1 and contains no holes, the corresponding notification versions sent from the gateway to the client would be:

N1=Versions [1, 10)
　N2=Versions [1, 15)

If the client receives N2 before N1, then it would incorrectly update Vc to be [1, 15) when it should actually be [1, 5)[10,15). The result from this is that the gateway can only send Vn=(Vb merged with Vg) for a notification if there are no other outstanding notifications that overlap with Vb. As a consequence, the implementation must queue all pending notifications and only send the first queued notification with a merged Vn. All other pending notifications must be sent with the actual update versions. The effect is that in situations where there are many pending notifications, the notification at the current head of the pending queue will get delivered to periodically remove version holes from Vc on the client.

The notifications are queued up per client with version ranges so that the client knows which notifications to accept without having to track all previously received notifications. This allows the client to collapse notification versions down to the start and end ranges of all notifications received so far. For example, after receiving notifications 1 to 100, the client only has to track the first and last notification versions of the range (i.e., 1 and 100) instead of all one hundred notifications.

Handling Service Deletions.

Deleted services result in updates from the FM that contain no service endpoints for the deleted service. The FM does not explicitly mark a broadcasted update as a "delete" update. For the previous long-poll notification implementation, it was sufficient to simply delete gateway cache entries immediately upon receiving a delete update and no additional special handling was needed. For the event-based implementation, the system must account for deleted entries in the synchronization protocol.

To achieve this, the client needs to keep track of all partitions for which it has received a non-empty notification and the associated versions. After connecting to a gateway, the client can send this list to the gateway to determine whether any of these partitions no longer exist in the cache. For each partition that no longer exists, the client can locally synthesize a delete notification.

This protocol can get expensive and defeats the purpose of maintaining merged version ranges. To reduce the need for this more expensive protocol, the gateway can keep empty partitions in its cache up to a configurable threshold, after which point it can trim older deleted entries in version order.

The synchronization protocol described earlier can be extended with a second phase. The initial client connection request remains unchanged. To reconnect to the gateway, the client sends:

Client→Gateway:
    Client ID
    Vc=List<Version Range>
    Filters=List<Filter{ID, Name, Flags}>

The gateway reply contains the version of the last deleted entry, which is zero if no deletes have occurred. The gateway sends a list of deleted services to the client.

Gateway→Client:
    Vd=Last deleted entry version

If Vc contains Vd, then the synchronization protocol is complete. Otherwise, the client must follow up with a synchronization request, which is paged. The Live Entries list includes the services that the client understands or believes have not been deleted.

Client→Gateway:
    Live Entries=List<Entry{PartitionID, Version}>

The gateway replies with a list of versions (a subset of those in Live Entries) for which it cannot find a cache entry.

Gateway→Client:
    Deleted Versions=List<Version>

Since the version at which the actual delete happened is not known, the synthesized delete notification will contain the same version as the prior non-delete notification. Furthermore, since Vc is used to determine whether or not this protocol needs to run at all, Vc cannot be modified before the client is fully synchronized with the gateway. As a consequence, any incoming notifications on the client are buffered and processed only after synchronization completes.

Data Structures.

The following data structures provide example implementation details for data structures to support the notification service.

The filter data structure is common to both the client and gateway.

Filter={Filter ID, Name, Flags}

The client uses the following data structures.
Registered Filters=Map<Name, Filter>
    (i.e., a map of registered filters)
Notification Version Ranges
    (i.e., received notification ranges)
Undeleted Partitions=Map<Version, Partition ID>+
    Map<Partition ID, Version>
    (i.e., Live Entries).

On the gateway, the following data structures are kept for each client connected to the gateway:

```
Client Registration = {
    Client Registration ID (derived from Send Target ID)
    Client ID
    Send Target   (i.e., TCP connection to send notifications to
    client).
    List<Filter>  (i.e., list of filters registered for this client)
    Notification Version Ranges (i.e., ranges received by client)
}
Client Registrations = Map<Client Registration ID, Client Registration>
Registered Filters = Map<Naming Uri, Map<Client Registration ID,
Filter>>
Prefix Cache Index = Map<Naming Uri, Cache Entry>
    (includes a breakdown of all registered filters for fast look-ups)
Cache Entry = { <Existing Data>, HasPrimaryChangedFlag }
    (list of every FM broadcast received by gateway)
    (allows tracking of whether a primary service endpoint has
    changed)
Deleted Entries = Map<Version, Partition ID>
```

The Prefix Cache Index is needed during client reconnection when matching filters against the gateway cache to allow the gateway to look up cache entries by Name rather than enumerating the cache. Cache entries maintain an extra flag to indicate whether the current entry contains a primary change from the previous version of this entry.

Notification Paging.

In the client/gateway protocol described herein, three protocol messages need to support paging or breaking up messages into smaller segments when the notification exceeds the size limit on the TCP transport.

1) Filter registration reply (List of version ranges)
2) Notification (List of notifications and list of version ranges)
3) Reconnection request (List of filters and list of version ranges)

The notifications (point 2 above) can be split into smaller messages that are processed independently so there is no need to correlate pages into a single message. When splitting a large notification, the corresponding version ranges are split as well. This can be done by sorting the individual partitions by version and performing the split at partition boundaries as needed. Note that if splitting at partition boundaries, then there are still cases when a single partition can exceed the message limit or pathologically, a single endpoint can also exceed the message limit. Consider cases where the service instance count is infinite (i.e., placed on all nodes) for example. However, in practice, the default message size limit of 4 MB is sufficient to support very large deployments, so it should not be necessary to split up a single partition entry or endpoint.

With the default message size limit of 4 MB, paging for 1) and 3) may not be needed. If needed, paging can be implemented as follows. These are messages that the receiver does not and should not need to act upon until the entire message is received. Furthermore, the receiver does not need to receive the pages in any particular order—it just needs all the pages. To support paging for these messages, what is needed is an instance for each message, a page index for each page of the message, and a total page index count or final page flag for the message. The receiver processes the pages as they come in and considers the message complete once all pages have been processed. Since the paging happens dynamically on the sender side, the total page index count or final page flag is unknown until the last page is generated.

Public API Overview.

The following description provides an overview of a public API for handling notifications in a distributed system. This example corresponds to notifications provided to clients in an Azure Service Fabric platform from Microsoft Corporation. The example API below is represented in C++ code, but it will be understood that the notifications may also be managed code, such as C#, or other unmanaged program code.

Event Handler.

Only a single callback is needed for the notifications. Overloads may be added the Create Client function to accept an optional Service Notification Event Handler. For example, an instance of a client that uses notifications may be created using:

```
[entry("FabricCreateLocalClient")] HRESULT FabricCreateLocalClient(
    [...],
    [in] IFabricServiceNotificationEventHandler *,
    [out, retval] void ** fabricClient);
```

The client only needs the single event handler to use notifications unlike the multiple handlers that were required to be registered for the previous long-poll implementation.

The following interfaces and structures are used for the notification event handler.

The event handler interface itself only has a single callback function with the notification object as its only parameter.

```
interface IFabricServiceNotificationEventHandler
{
    [ ] void OnNotification(
        [in] IFabricServiceNotification *);
}
```

OnNotification is the callback that is received anytime a service changes in the system, such as services moving between nodes or a new replica being built or torn down.

The notification structure may be represented as follows:

```
typedef struct FABRIC_SERVICE_NOTIFICATION
{
    FABRIC_URI ServiceName;
    FABRIC_PARTITION_ID PartitionId;
    ULONG EndpointCount;
    [size_is(EndpointCount)]
    FABRIC_RESOLVED_SERVICE_ENDPOINT * Endpoints;
    FABRIC_SERVICE_PARTITION_INFORMATION *
    PartitionInfo;
    void * Reserved;
} FABRIC_SERVICE_NOTIFICATION;
```

This structure includes the service name (ServiceName), a partition ID that identifies the partition within the service (PartitionId), and a list of endpoints (Endpoints). The endpoints field is a list of strings representing all the endpoints that are available for this service. The endpoints may be, for example, the URIs that the service returned back to the system as its registered endpoints. This list of endpoints would change with each notification as the service changes. Many different services may be deployed on the cluster. Each time one of the services changes, a notification is sent with a list of all the endpoints available for that service (e.g., for a service with five replicas distributed throughout the cluster, the notification includes five endpoints). The endpoints list may also include information identifying whether the endpoint corresponds to a primary partition of the service or a secondary partition. In one embodiment, the filter may be optimized to provide notifications only when the primary endpoint changes but not for changes to the secondary endpoints. The service partition information field (PartitionInfo) may contain any relevant metadata about the service, such as different kinds of partitions in the service.

Every time the services are changed, that change is stamped with a version number, which may be an increasing integer, for example. The version number provides the system and the client with a means for ordering the changes as they are received. For example, when multiple callbacks are received for the same service, the callback with the highest version number corresponds to the most recent version. The service notification interface is used to retrieve the actual notification data as a struct. The service notification may include an abstracted "endpoints version" that can be used to order two notifications. The version comparison function is not on the notification itself so that applications can cache their own service communication objects without also caching the entire notification just for the sole purpose of version-checking. Alternatively, all notifications could be ordered for the application by serializing the OnNotification( ) callback, however, that would unnecessarily prevent parallel processing of notifications in the general case.

```
interface IFabricServiceNotification
{
    [ ] const FABRIC_SERVICE_NOTIFICATION *
    get_Notification( );
    [ ] HRESULT GetVersion(
        [out, retval] IFabricServiceEndpointsVersion ** result);
}
interface IFabricServiceEndpointsVersion
{
    [ ] HRESULT Compare(
        [in] IFabricServiceEndpointsVersion * other,
        [out, retval] LONG * compareResult);
}
```

Registering and Unregistering Notification Filters.

The following code allows the client to express interest in particular services so that notifications will be delivered to the client. Every service has a name (e.g., "FABRIC_URI Name" below) that comprises a URI or path (e.g., "FABRIC:/a/b/c" or "X:/a/b/c") for that service. The notification filters can be registered to include all or a portion of the URI or path. This allows the filter to specify whether the client is interested in notifications only for a single service instance or notifications for any services under a broader name prefix. For example, a filter registered for X:/a/b would return notifications for services named "X:/a/b/c" and "X:/a/b/d;" while a filter registered for X:/a/b/c would not return notifications for the changes to the service named "X:/a/b/d." Accordingly, the API disclosed herein allows the client to filter based upon a prefix of a service name to obtain information about all services on the cluster that share that service name prefix. This is advantageous compared to prior notification schemes that require the client to have explicit knowledge of not only the service of interest, but also each partition for that service of interest.

These APIs are asynchronous since registering and unregistering filters requires sending messages from the client to the gateway.

Example code for a notification registration API is:

```
HRESULT BeginRegisterServiceNotificationFilter(
    [in] const FABRIC_SERVICE_NOTIFICATION_FILTER_DESCRIPTION * filter,
    [...]);
HRESULT EndRegisterServiceNotificationFilter(
    [out, retval] LONGLONG * filterId,
    [...]);
```

Example code for an API to unregister a notification is:

```
HRESULT BeginUnregisterServiceNotificationFilter(
    [in] LONGLONG filterId,
```

-continued

```
    [...]);
    HRESULT EndUnregisterServiceNotificationFilter([...]);
```

Since the client keeps registered filters in memory, an API can be provided for retrieving a list of all registered filters as a convenience for the client application, such as:

HRESULT GetRegisteredServiceNotificationFilters([out, retval]IFabricServiceNotificationFiltersResult*filters);

The following new interfaces and structures support the example filters-related APIs above.

Filter Result.

```
interface IFabricServiceNotificationFiltersResult
{
    [ ] const FABRIC_SERVICE_NOTIFICATION_FILTER_LIST
    * get_Filters( );
}
```

Filter List.

```
struct FABRIC_SERVICE_NOTIFICATION_FILTER_LIST
{
    ULONG Count;
    [size_is(Count)] const
    FABRIC_SERVICE_NOTIFICATION_FILTER_ITEM * Items;
}
```

Filter Item.

```
struct FABRIC_SERVICE_NOTIFICATION_FILTER_ITEM
{
    LONGLONG FilterId;
    const
    FABRIC_SERVICE_NOTIFICATION_FILTER_DESCRIPTION *
Description;
    void * Reserved;
}
```

Filter Description.

```
struct FABRIC_SERVICE_NOTIFICATION_FILTER_DESCRIPTION
{
    FABRIC_URI Name;
    FABRIC_SERVICE_NOTIFICATION_FILTER_FLAGS Flags;
    void * Reserved;
}
```

Filter Flags.

```
enum FABRIC_SERVICE_NOTIFICATION_FILTER_FLAGS
{
FABRIC_SERVICE_NOTIFICATION_FILTER_FLAGS_NONE        = 0x0000,
FABRIC_SERVICE_NOTIFICATION_FILTER_FLAGS_NAME_PREFIX = 0x0001,
FABRIC_SERVICE_NOTIFICATION_FILTER_FLAGS_PRIMARY_ONLY = 0x0002,
}
```

The filter flags provide optional modifiers on how the filtering works. The flags are set as part of the filter description. If no flag is set (i.e., NONE 0x0000), then the notifications operate like previous systems and notifications are provided only for the services having the specific URI or path listed in the filter description. If the NAME_PREFIX flag is set (i.e., 0x0001), then notifications are provided for service names matching the specific URI or path listed in the filter description plus any services having that URI or path as the prefix of its name. If the PRIMARY_ONLY flag is set (i.e., 0x0002), then notifications are provided only for primary replicas matching the URI or path listed in the filter description. In this case, no notifications are provided for changes to the secondary replicas when the PRIMARY_ONLY flag is set.

Figure 3:
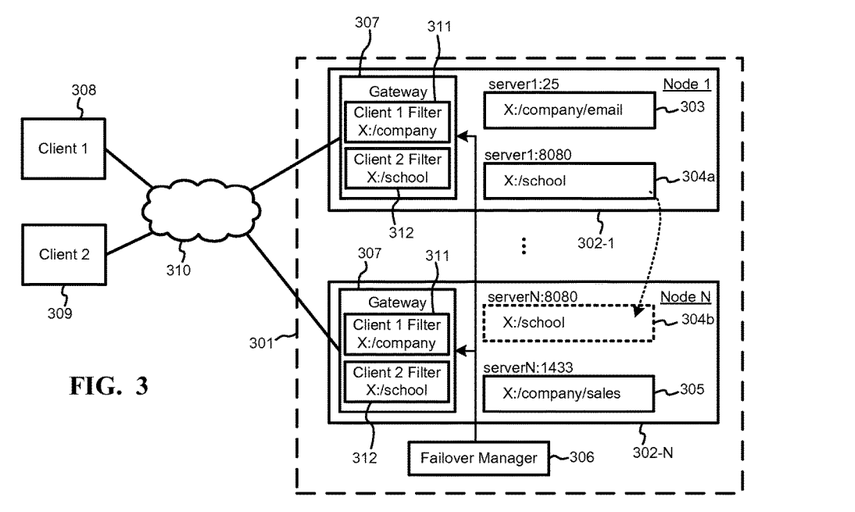
FIG. 3 is an example embodiment illustrating two clients using notification filters to access services on a distributed system.

FIG. 3 is an example embodiment illustrating two clients using notification filters to access services on a distributed system. Cluster 301 comprises N nodes 302 running instances of service 303-305. The services 303-306 are identified by a name having a format "X:/a/b/c." Failover Manager 306 controls the distribution of service instances 303-305 on the nodes 302. Periodically, Failover Manager 306 broadcasts configuration information to gateways 307 on each node 302. The configuration information identifies a current configuration version and includes endpoint information for each service running on cluster 301. In FIG. 3, the endpoints are identified using the format <hostname>:<port>, for example.

Initially, three services 303, 304a, 305 are running on the cluster. Node 1 is running services X:/company/email and X:/school; and node N is running service X:/company/sales. The X:/company/email and X:/company/sales services may be deployed by the same tenant for different services to provide an email server and sales database, for example. The X:/school service may be a student records application deployed by a school. Failover Manager 306 will broadcast configuration information version updates to gateways 307 as each of these services are deployed. At some point, the X:/school service 304a is moved from node 1 and restarted as service X:/school 304b on node N. This may occur, for example, due to connectivity issue on node 1, load balancing within cluster 301, resource requirements of the service, or for some other reason. After the X:/school service moves, Failover Manager 306 broadcasts updated configuration version information to gateways 307 with the new endpoint for X:/school 304b.

Users access the services 303-305 deployed on cluster 301 via clients 308, 309. Clients 308, 309 communicates with cluster 301 through network 310 and access the services though gateway 307. Each client may register one or more filters 311, 312 with gateways 307 to identify the endpoints of certain services running on the cluster 301. For example, client 308 may register a filter named "X:/company" and client 309 may register a filter named "X:/school." Each time it receives a new Failover Manger broadcast, the gateway 307 compares the service names in the broadcast to the filter names. If any of the filter names match the updated services, then the gateway provides a notification including the updated service endpoint to the client that registered that filter. For example, when service X:/school 304a is moved to service X:/school 304b, the gateways 307 will receive the update endpoint for the X:/school service in the next Failover Manager broadcast. The gateways 307 will match the name of the filter 312 registered by client 309 with the updated service endpoint. The gateway 307 that is currently communicating with client 309 will then send a notification of the new endpoint for the X:/school service.

As noted in the discussion above, the filters may be configured, such as by setting flags, to match the filter name to an exact service name or to match the filter name to at least a prefix of the service name. For example, client 308 has registered a filter named "X:/company" that will produce notifications from gateway 307 using prefix matching every time the endpoint changes for either service X:/company/email 303 or service X:/company/sales 305 (or if both change). Client 308 may also register a filter named "X:/company/email" that would produce notifications from gateway 307 only when the endpoint changes for service X:/company/email 303. The "X:/company/email" filter would not generate notifications when the endpoint for the service X:/company/sales 305 changed.

It will be understood that the service and filter naming convention used herein are examples only and that any hierarchical naming convention may be used to provide prefix-based filtering. Accordingly, while the X:/a/b/c and Fabric:/a/b/c service names have been used above, any other hierarchical, branching, parent-child, or nested service naming convention or URI may be used in other embodiments.

Figure 4:
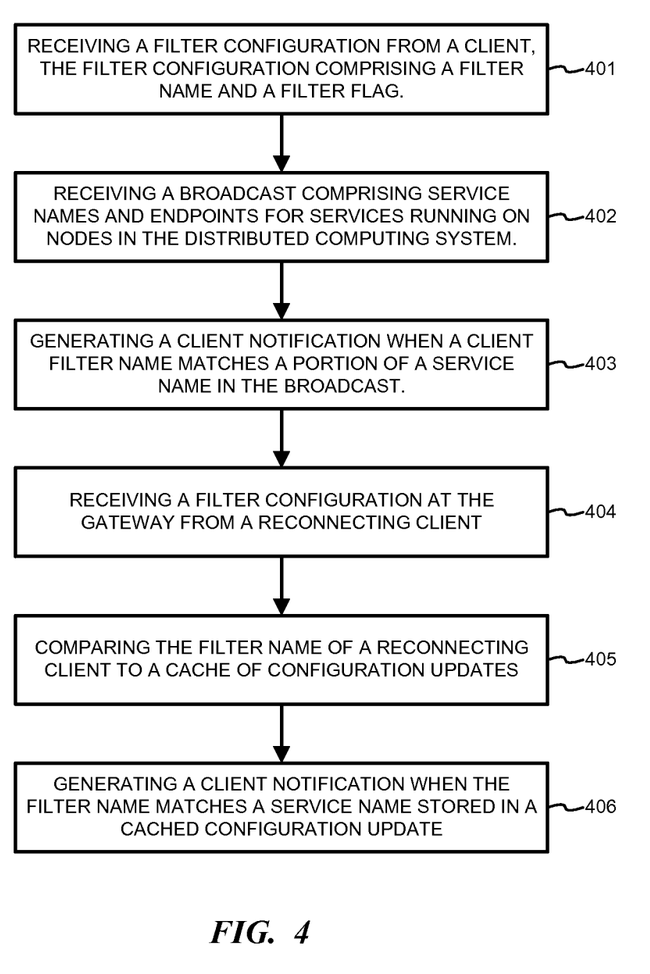
FIG. 4 is a flowchart illustrating a method for providing notifications to clients when service endpoints change within a cluster.

FIG. 4 is a flowchart illustrating a method for providing notifications to clients when service endpoints change within a cluster. In step 401, a filter configuration is received at a gateway from a client. The gateway is on a node in a distributed computing system. The filter configuration comprises a filter name and a filter flag. The filter flag indicates whether a filter should be matched to an exact service name or to a prefix of a service name. Alternatively, the filter flag may indicate that a client notification should be generated only when a filter name matches a service name for a primary replica of a service.

In step 402, the gateway receives a broadcast comprising service names and endpoints for services running on nodes in the distributed computing system. The gateway receives the configuration updates from a failover manager on the distributed computing system. The gateway may receive a configuration update version in the broadcast.

In step 403, a client notification is generated by the gateway when a client filter name matches a portion of a service name in the broadcast. The client notification comprises at least the endpoint for the matched service name. The gateway may further maintain a record of configuration update versions associated with the client notifications sent to a client. The client notification may include a version range identifying the configuration update versions associated with a current client notification.

In step 404, a filter configuration is received from a reconnecting client. In step 405, the filter name of the reconnecting client is compared to a cache of configuration updates. In step 406, a client notification is generated when the filter name of the reconnecting client matches at least a portion of a service name stored in a cached configuration update.

It will be understood that steps 401-406 of the process illustrated in FIG. 4 may be executed simultaneously and/or sequentially. It will be further understood that each step may be performed in any order and may be performed once or repetitiously.

A system comprises a plurality of nodes configured to run one or more services, each of the nodes comprising a gateway configured to provide communication between the node and clients; the gateways configured to manage filters designated by the clients, the filters named based upon a naming format used to name the services, wherein the gateways are further configured to receive service configuration updates comprising service endpoint changes and to provide notifications to clients when a filter name matches at least a portion of a service name in a configuration update.

The system further comprises a failover manager configured to manage service deployment on the plurality of nodes, the failover manager generating the configuration updates. The plurality of nodes are managed as a cluster in a distributed computing system. The configuration updates identify a configuration version, and wherein the gateways are further configured to provide notifications comprising endpoint information from more than one configuration update version. A filter is configured to match a prefix of a service name or configured to match an entire service name. The gateways provide notifications to clients only when the endpoint for a primary replica of a service has changed. The gateways are further configured to maintain a cache of received service configuration updates and to provide notifications to reconnected clients when the filter name matches at least a portion of a service name in the cache.

A computer-implemented method comprises receiving, at a gateway on a node in a distributed computing system, a broadcast comprising service names and endpoints for the named services; and generating a client notification when a client filter name matches a portion of a service name in the broadcast, the client notification comprising at least the endpoint for the matched service name.

The computer-implemented method further comprises receiving, at the gateway, a filter configuration from a client, the filter configuration comprising the filter name and a set of filter flags. The filter flags may indicate whether a filter should be matched to an exact service name or to a prefix of a service name. The filter flags may indicate that a client notification should be generated only when a filter name matches a service name for a primary replica of a service.

The computer-implemented method further comprises receiving a configuration update version in the broadcast; and maintaining a record of configuration update versions associated with the client notifications sent to a client.

The computer-implemented further comprises receiving the filter configuration from a reconnecting client; comparing the filter name to a cache of configuration updates; and generating the client notification when the client filter name matches a portion of a service name stored in a cached configuration update. The client notification comprises a version range identifying the configuration update versions associated with the client notification. The client notification comprise endpoints updated in both a current broadcast and in the cached configuration update.

The computer-implemented method further comprises receiving a synchronization request from a client, the synchronization request comprising a list of services the client considers active; and in response to the synchronization request, generating a list of deleted services from the list of services the client considers active.

A computing node in a distributed computing system comprises a gateway configured to provide communication between the node and clients; a list of filters stored on the gateway, the filters designated by the clients and named using a naming format associated with services running on the distributed computing system; the gateway configured to receive configuration updates from a failover manager on the distributed computing system, the configuration updates comprising endpoint changes for services running on the distributed computing system, and the gateway further configured to generate a client notification when a filter name matches a portion of a service name in a configuration update, the client notification comprising at least the endpoint for the matched service name.

The configuration updates identify a configuration version, and wherein the gateway is further configured to provide notifications comprising endpoint information from more than one configuration update version. The filters are selectively configured by the clients to match the filter name to either a prefix of a service name or an entire service name. The gateway is further configured to maintain a cache of received configuration updates and to provide notifications to reconnected clients when a reconnected client's filter name matches at least a portion of a service name in the cache.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   a plurality of nodes to run one or more services, each of the nodes comprising a gateway device to provide communication between the node and clients; and
   the gateway devices to manage filters designated by the clients, the filters named based upon a naming format used to name the services,
   wherein the gateway devices receive service configuration updates comprising service endpoint changes and provide notifications to clients when a filter name matches at least a portion of a service name in a configuration update,
   wherein the gateway devices maintain a cache of received service configuration updates and provide notifications to reconnected clients when the filter name matches at least a portion of the service name in the cache; and
   wherein the gateway devices provide notifications to clients only when an endpoint for a primary replica of a service has changed.

2. The system of claim 1, further comprising:
   a failover manager device to manage service deployment on the plurality of nodes, the failover manager device generating the configuration updates.

3. The system of claim 1, wherein the plurality of nodes are managed as a cluster in a distributed computing system.

4. The system of claim 1, wherein the configuration updates identify a configuration version, and wherein the gateway devices provide notifications comprising endpoint information from more than one configuration update version.

5. The system of claim 1, wherein each filter matches a prefix of the service name or an entirety of the service name.

6. A computer-implemented method, comprising:
   receiving, at a gateway device on a node in a distributed computing system, a broadcast comprising service names and endpoints for the named services;
   generating a client notification when a client filter name matches a portion of a service name in the broadcast, the client notification comprising at least an endpoint for a matched service name;
   receiving a filter configuration from a reconnecting client;
   comparing the client filter name to a cache of configuration updates; and
   generating the client notification when the client filter name matches a portion of the service name stored in a cached configuration update,
   wherein the client notification is generated only when the client filter name matches the service name for a primary replica of a service.

7. The computer-implemented method of claim 6, further comprising:
   receiving, at the gateway device, a filter configuration from a client, the filter configuration comprising the client filter name and a set of filter flags.

8. The computer-implemented method of claim 7, wherein the filter flags indicate whether the client filter name should be matched to the service name exactly or to a prefix of the service name.

9. The computer-implemented method of claim 6, further comprising:
   receiving a configuration update version in the broadcast; and
   maintaining a record of configuration update versions associated with client notifications sent to a client.

10. The computer-implemented method of claim 6, wherein the client notification comprises a version range identifying configuration update versions associated with the client notification.

11. The computer-implemented method of claim 6, wherein the client notification comprise endpoints updated in both a current broadcast and in the cache of configuration updates.

12. The computer-implemented method of claim 6, further comprising:
   receiving a synchronization request from a client, the synchronization request comprising a list of services the client considers active; and
   in response to the synchronization request, generating a list of deleted services from the list of services the client considers active.

13. A computing node in a distributed computing system, comprising:
   a gateway device to provide communication between the computing node and clients; and
   a list of filters stored on the gateway device, the filters designated by the clients and named using a naming format associated with services running on the distributed computing system;
   wherein the gateway device receives configuration updates from a failover manager device on the distributed computing system, the configuration updates comprising endpoint changes for services running on the distributed computing system;
   wherein the gateway device generates a client notification when a filter name matches a portion of a service name in a configuration update, the client notification comprising at least an endpoint for a matched service name;
   wherein the gateway device maintains a cache of received configuration updates and provides notifications to reconnected clients when a filter name of a reconnected client matches at least a portion of the service name in the cache; and
   wherein the client notification is generated only when the filter name matches the service name for a primary replica of a service.

14. The computing node of claim 13, wherein the configuration updates identify a configuration version, and wherein the gateway device provides notifications comprising endpoint information from more than one configuration update version.

15. The computing node of claim 13, wherein the filters are selectively configured by the clients to match the filter name to either a prefix of the service name or an entirety of the service name.

\* \* \* \* \*